US012654994B2

(12) United States Patent
Liu et al.

(10) Patent No.:  US 12,654,994 B2
(45) Date of Patent:      Jun. 16, 2026

(54) APPARATUS AND METHOD FOR CONTROLLING AN ESCALATOR SYSTEM OR AN AUTOMATED WALKWAY SYSTEM

(71) Applicant: Otis Elevator Company, Farmington, CT (US)

(72) Inventors: Wentong Liu, Hangzhou (CN); Lifei Cheng, Hangzhou (CN); Zhaoxia Hu, Hangzhou (CN); Kaisheng Xu, Haining (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 194 days.

(21) Appl. No.: 18/510,097

(22) Filed: Nov. 15, 2023

(65) Prior Publication Data

US 2024/0253951 A1      Aug. 1, 2024

(30) Foreign Application Priority Data

Jan. 30, 2023    (CN) .......................... 202310092341.5

(51) Int. Cl.
  B66B 25/00        (2006.01)
  B66B 23/02        (2006.01)
  H02P 23/14        (2006.01)
(52) U.S. Cl.
  CPC ............ B66B 25/003 (2013.01); B66B 23/02 (2013.01); H02P 23/14 (2013.01)
(58) Field of Classification Search
  CPC ....... B66B 25/003; B66B 23/02; B66B 25/00; B66B 2201/216; H02P 23/14; Y02B 50/00
  See application file for complete search history.

(56) References Cited

U.S. PATENT DOCUMENTS 4,738,346 A  *  4/1988  Matsueda ............... B66B 23/02
                                                                  198/805
9,120,647 B2 *  9/2015  Liang ..................... B66B 25/00
                      (Continued)

FOREIGN PATENT DOCUMENTS

EP            2743228 A1 *  6/2014  ............. B66B 25/00
JP     2007210710 A  *  8/2007
                      (Continued)

OTHER PUBLICATIONS

European Search Report for Application No. 24150678.1, Issued Apr. 23, 2024, 8 Pages.

*Primary Examiner* — Gene O Crawford
*Assistant Examiner* — Abby A Jorgensen
(74) *Attorney, Agent, or Firm* — CANTOR COLBURN LLP

(57)            ABSTRACT

A method includes determining a load value of a system; and determining a current operating mode of a three-phase motor in the following manner: if the load value is below a first threshold, determining a variable frequency mode as the current operating mode, if the load value is between the first threshold and a second threshold, determining a first operating frequency mode as the current operating mode, and if the load value exceeds the second threshold, determining a second operating frequency mode as the current operating mode, the second threshold is greater than the first threshold, the windings of the three-phase motor are wired in a star wiring method and in a triangular wiring method in the first and second operating frequency modes, respectively.

24 Claims, 5 Drawing Sheets

(56)                    References Cited

U.S. PATENT DOCUMENTS

| | | | | |
|---|---|---|---|---|
| 9,136,788 | B2 * | 9/2015 | Okubo | F04C 28/06 |
| 10,926,978 | B2 * | 2/2021 | Kimura | B66B 25/00 |
| 2003/0000801 | A1 | 1/2003 | Spannhake et al. | |
| 2016/0311645 | A1 * | 10/2016 | Agirman | H02M 7/487 |
| 2023/0406675 | A1 * | 12/2023 | Prenner | B66B 25/00 |

FOREIGN PATENT DOCUMENTS

| | | | | |
|---|---|---|---|---|
| JP | 2014037297 | A | * | 2/2014 |
| JP | 5496285 | B2 | | 3/2014 |

* cited by examiner

APPARATUS AND METHOD FOR CONTROLLING AN ESCALATOR SYSTEM OR AN AUTOMATED WALKWAY SYSTEM

FOREIGN PRIORITY

This application claims priority to Chinese Patent Application No. 202310092341.5 filed Jan. 30, 2023, and all the benefits accruing therefrom under 35 U.S.C. § 119, the contents of which in its entirety are herein incorporated by reference.

TECHNICAL FIELD

The present application relates to elevator technology, in particular to a device and method for controlling an escalator system or a moving walkway system, an escalator system or a moving walkway system comprising the device, and computer-readable storage medium on which a computer program for implementing the method is stored.

BACKGROUND

The importance of the environment to human development is self-evident, and countries around the world are taking active and effective measures to improve the environment and reduce pollution, of which energy saving is the key and most direct and effective way. For escalator systems and moving walkway systems, in addition to using inverters, other means of energy saving include using different motor connections at different loads. However, what currently troubles the industry is that the energy-saving effect achieved by the control logic that determines motor connections based on the loads is not yet satisfactory.

SUMMARY

According to an aspect of the present application, there is provided a device for controlling an escalator system or a moving walkway system, comprising: a memory; a controller coupled with the memory; and a computer program stored on the memory and running on the controller, the running of the computer program causes: determining a load value of the escalator system or the moving walkway system; and determining a current operating mode of a three-phase motor in the escalator system or the moving walkway system in the following manner: if the load value is below a first threshold, determining a variable frequency mode as the current operating mode, if the load value is between the first threshold and a second threshold, determining a first operating frequency mode as the current operating mode, and if the load value exceeds the second threshold, determining a second operating frequency mode as the current operating mode, wherein the second threshold is greater than the first threshold, wherein windings of the three-phase motor are wired in a star wiring method and in a triangular wiring method in the first and second operating frequency modes, respectively.

Optionally, in the above device, the operation of determining the load value of the escalator system or the moving walkway system comprises: receiving a count value from a photoelectric counting device arranged near an entrance and exit of a conveying mechanism of the escalator system or the moving walkway system; determining, based on the received count value, the number of occupants of the escalator system or the moving walkway system, the number of occupants being used to indicate the load value.

Further, in the above device, the operation of determining the load value of the escalator system or the moving walkway system further comprises: performing a reset operation on the count value based on one of the following conditions: i) if the count value of the photoelectric counting device at the entrance does not change during a set period; ii) if difference between the count values of the photoelectric counting device at the entrance and the photoelectric counting device at the exit exceeds a first set value.

Optionally, in the above device, the operation of determining the load value of the escalator system or the moving walkway system comprises: receiving a pressure signal from a pressure sensor arranged near an entrance and exit of a conveying mechanism of the escalator system or the moving walkway system; determining a load-bearing weight of the escalator system or the moving walkway system based on an integral value of the received pressure signal over time, the load-bearing weight being used to indicate the load value.

Further, in the above device, the operation of determining the load value of the escalator system or the moving walkway system further comprises: performing a reset operation on the integral value based on one of the following conditions: i) if difference between the integral values of the pressure signals at the entrance and at the exit over time does not change during a set period; ii) if a cumulative value of the difference exceeds a second set value.

Optionally, in the above device, the first threshold is 0 and the second threshold is set equal to a critical value around which motor efficiency of the three-phase motor in the first operating frequency mode is close to its motor efficiency in the second operating frequency mode.

Optionally, in the above device, in the variable frequency mode, the windings of the three-phase motor are wired in a star wiring method.

Optionally, in the above device, the running of the computer program further causes:

generating a control command to operate the three-phase motor in the determined current operating mode.

According to another aspect of the present application, there is provided an escalator system or a moving walkway system, comprising: a conveying mechanism; a three-phase motor for driving the conveying mechanism, adapted to operate in a variable frequency mode, a first operating frequency mode and a second operating frequency mode, windings of the three-phase motor are wired in a star wiring method and in a triangular wiring method in the first and second operating frequency modes, respectively; a control device configured to: determining a load value of the escalator system or the moving walkway system; and determining a current operating mode of the three-phase motor in the escalator system or the moving walkway system in the following manner: if the load value is below a first threshold, determining the variable frequency mode as the current operating mode, if the load value is between the first threshold and a second threshold, determining the first operating frequency mode as the current operating mode, and if the load value exceeds the second threshold, determining the second operating frequency mode as the current operating mode, wherein the second threshold is greater than the first threshold.

According to another aspect of the present application, there is provided a method for controlling an escalator system or a moving walkway system, comprising: determining a load value of the escalator system or the moving walkway system; and determining a current operating mode of a three-phase motor in the escalator system or the moving walkway system in the following manner: if the load value is below a first threshold, determining a variable frequency mode as the current operating mode, if the load value is between the first threshold and a second threshold, determining a first operating frequency mode as the current operating mode, and if the load value exceeds the second threshold, determining a second operating frequency mode as the current operating mode, wherein the second threshold is greater than the first threshold, wherein windings of the three-phase motor are wired in a star wiring method and in a triangular wiring method in the first and second operating frequency modes, respectively.

According to another aspect of the present application, there is provided a computer-readable storage medium on which a computer program suitable for running on a processor of a terminal device is stored, the running of the computer program causing the steps of the method as described above to be performed.

DESCRIPTION OF THE DRAWINGS

The above and/or other aspects and advantages of the present application will be clearer and more easily understood from the following description of various aspects in conjunction with the accompanying drawings, in which the same or similar elements are denoted by the same reference numerals. The accompanying drawings include.

DETAILED DESCRIPTION

Figure 1:
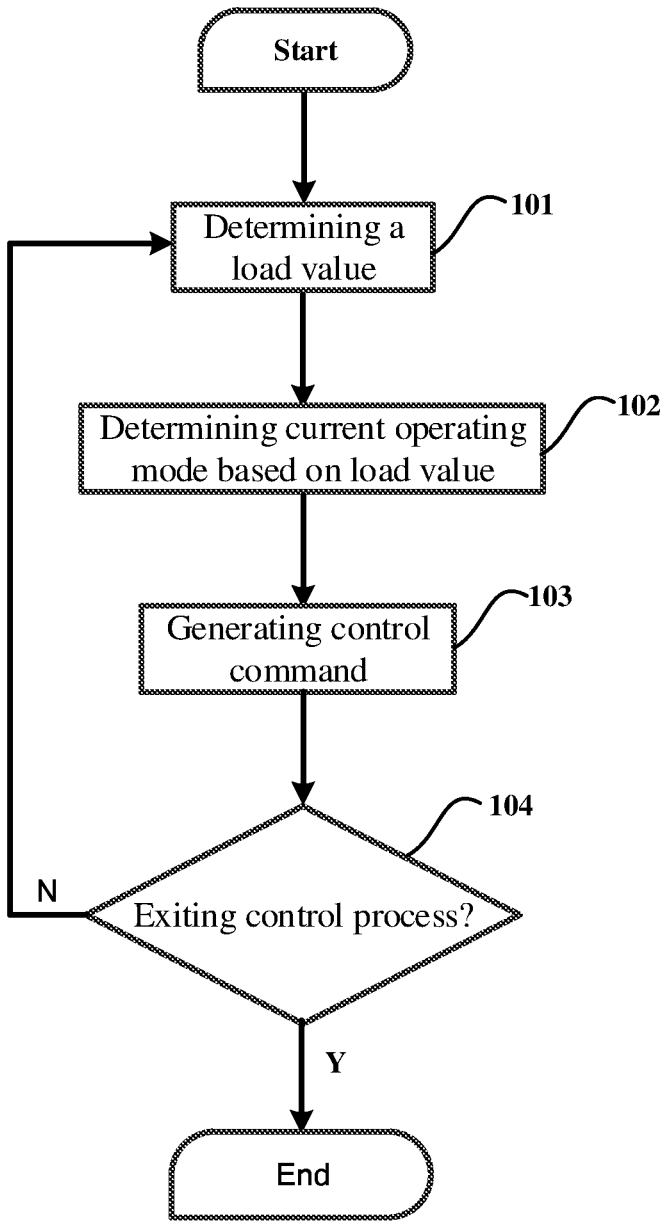
FIG. 1 is a flowchart of a method for controlling an escalator system or a moving walkway system in accordance with some embodiments of the present application.

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of the application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

In the specification of the application, the term "escalator system" refers to a continuous conveying device used to transport passengers and goods between different heights in an upward or downward inclined direction, which usually includes steps with a circular motion as a conveying mechanism.

In the specification of the application, the term "moving walkway system" refers to a continuous conveying device used to transport passengers and goods in a horizontal direction or in a direction with a small inclination angle, which usually includes a movable surface with a circular motion as a conveying mechanism.

A three-phase motor may operate in a variable frequency mode or an operating frequency mode. In the variable frequency mode, control is achieved by changing the AC frequency supplied to the motor. In the operating frequency mode, the power supply frequency to the motor is the grid frequency, i.e., the AC power from the grid is used directly to supply the motor. On the other hand, the three-phase motor may usually use two wiring methods, namely a star wiring (Y-connection) method and a triangular wiring (Δ-connection) method. The star wiring method described here is a wiring method between a three-phase AC power supply and a three-phase electrical appliance, in which ends X, Y, and Z of the three windings of the three-phase power supply are connected together to form a common point O, and three end wires are led from the beginning A, B and C. The triangular wiring method connects each phase of the power supply or load in sequence from end to end, and leads each connected point as the three phase lines of the three-phase power.

In the following description, the operating mode of the three-phase motor operating in the variable frequency mode is referred to as the VF mode or variable frequency mode. For the three-phase motor operating in the operating frequency mode, the operating mode corresponding to the star wiring method is referred to as the NET-Y mode or first operating frequency mode, and the operating mode corresponding to the triangular wiring method is referred to as the NET-Δ mode or second operating frequency mode.

FIG. 1 is a flowchart of a method for controlling an escalator system or a moving walkway system in accordance with some embodiments of the present application. Exemplarily, the operating modes of the three-phase motor in the escalator system or the moving walkway system may include a variable frequency mode (VF mode), a first operating frequency mode (NET-Y mode), and a second operating frequency mode (NET-Δ mode). The method described below may be implemented by various devices which include, for example, but are not limited to, control devices within the escalator system, control devices within the moving walkway system, and control devices independent of the systems, which are hereafter referred to collectively as control devices.

The method shown in FIG. 1 begins at step 101. In this step, the control device determines a load value LOAD of the escalator system or the moving walkway system. The load value described herein is used to measure the actual work load of the escalator system or the moving walkway system, which includes, for example, but is not limited to, the number of occupants of the escalator system or the moving walkway system, and the weight carried by the escalator system or the moving walkway system, etc. Details of the load value are described below.

This is followed by step 102. In this step, the control device selects a suitable current operating mode for the three-phase motor in the escalator system or the moving walkway system based on the load value LOAD, so that the motor operates in the range with higher motor efficiency as much as possible. In some embodiments, the current operating mode may be determined based on the following rules:

If the load value LOAD is lower than a first threshold TH1, the variable frequency mode is determined as the current operating mode, at this time the three-phase motor will operate at a low speed and low energy consumption. Optionally, in the variable frequency mode, the windings of the three-phase motor are wired in the star wiring method. Exemplarily, the first threshold TH1 may be set to 0, i.e. corresponding to the no-load state of the escalator system or the moving walkway system.

If the load value LOAD is between the first threshold TH1 and a second threshold TH2 (e.g. TH1≤LOAD≤TH2), the first operating frequency mode is determined as the current operating mode. The selection of the second threshold is described below.

If the load value LOAD exceeds the second threshold TH2 (e.g., LOAD>TH2), the second operating frequency mode is determined as the current operating mode.

Exemplarily, a larger percentage value (e.g., 35%-45%) of the maximum allowable load (e.g., maximum number of persons carried or maximum load-bearing weight) of the escalator system or the moving walkway system may be set as the second threshold TH2; furthermore, the first threshold TH1 may be set as a smaller percentage value (e.g., 5%-6%) of the maximum allowable load, in addition to taking a value of 0.

Then proceed to step 103, where the control device generates a control command to operate the three-phase motor in the determined current operating mode.

After executing step 103, the method flow shown in FIG. 1 moves to step 104. In this step, the control device will determine whether it is necessary to exit the control process for the escalator system or the moving walkway system, and if so, exit the process shown in FIG. 1, otherwise, return to step 101. Trigger conditions for exiting the control process include, for example, but are not limited to, a user's immediate input of shutdown command or the user's preset timed shutdown command, etc.

Figure 2:
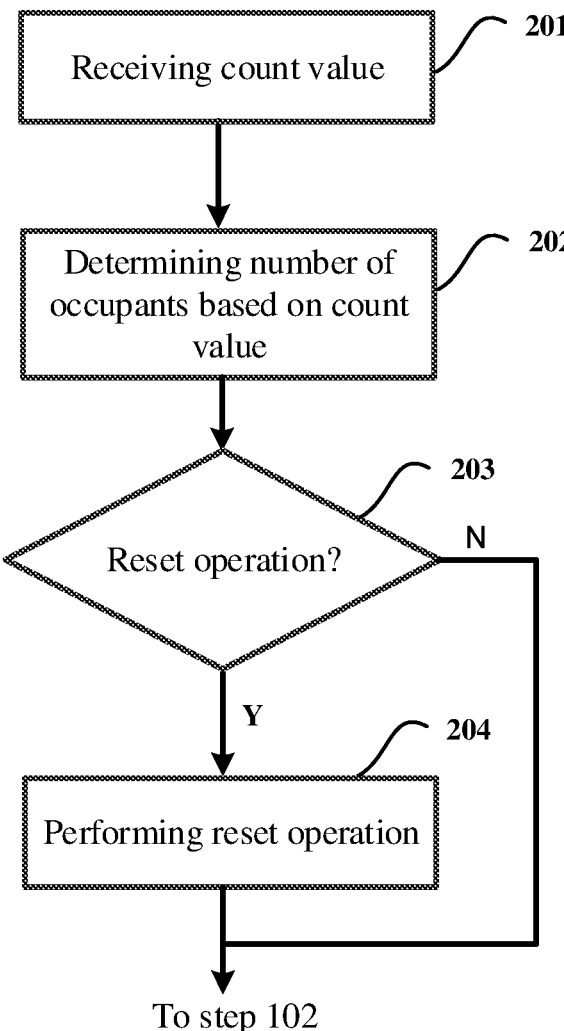
FIG. 2 shows a flowchart of a method for determining a load value of the escalator system or the moving walkway system in accordance with some other embodiments of the present application.

In some embodiments, in step 101 of FIG. 1, the load value of the escalator system or the moving walkway system may be determined in the manner shown in FIG. 2. As shown in FIG. 2, in step 201, the control device receives a count value from a photoelectric counting device (which comprises, for example, an inductive counter containing paired transmitters and receivers) arranged near an entrance and exit of the escalator system or the moving walkway system. Then proceeding to step 202, the control device determines the number of occupants of the escalator system or the moving walkway system based on the received count value. Exemplarily, assuming that the photoelectric counting devices A and B are installed at the entrance and exit of the escalator system or the moving walkway system respectively, the count values of the photoelectric counting devices A and B will change when a person or object passes through the entrance and exit, and the difference of the count values at the current moment is obtained by subtracting the count values of the two counting devices at the current moment. And by adding this difference to the difference in the count values of multiple previous moments, the number of occupants at the current moment may be obtained.

It should be noted that, in order to eliminate or reduce the cumulative error, the count values of the photoelectric counting devices A and B may be reset regularly or irregularly. To this end, the method shown in FIG. 2 proceeds to step 203 after performing step 202. In this step, the control device determines whether it is necessary to perform a reset operation on the count values of the photoelectric counting devices A and B. If so, it proceeds to step 204 to perform the reset operation, otherwise, it proceeds to step 102. After performing step 204, the process shown in FIG. 2 also proceeds to step 102.

In one example, if the count value of the photoelectric counting device A at the entrance does not change within a sufficiently long period of time (optionally, the period of time is equal to the length of time it takes for a step of the escalator system or the moving walkway system to reach the exit from the entrance), the reset operation described above is triggered. In another example, the above reset operation is triggered when the cumulative value of the difference between the count values of the photoelectric counting devices A and B exceeds a set value THN (e.g., a value significantly greater than the maximum number of persons carried by the escalator system or the moving walkway system). In yet another example, if either of the above two trigger conditions is met, the reset operation is performed.

Figure 3:
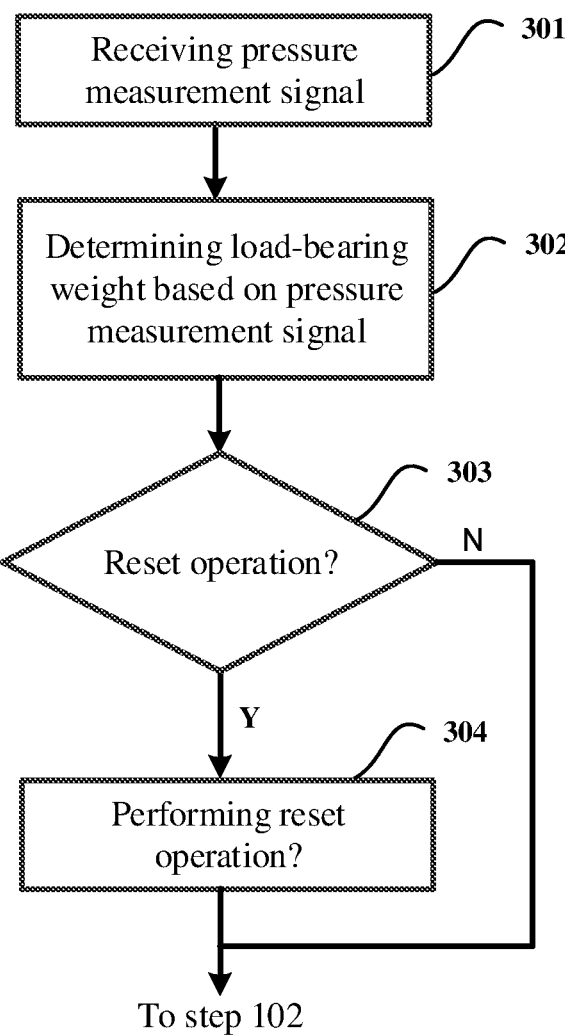
FIG. 3 shows a flowchart of a method for determining a load value of the escalator system or the moving walkway system in accordance with some other embodiments of the present application.

In other embodiments, in step 101 of FIG. 1, the load value of the escalator system or the moving walkway system may be determined in the manner shown in FIG. 3. As shown in FIG. 3, at step 301, the control device receives a pressure measurement signal from a pressure sensor arranged near an entrance and exit of the escalator system or the moving walkway system. Subsequently proceeding to step 302, the control device determines the load-bearing weight of the escalator system or the moving walkway system based on the received pressure measurement signal. Exemplarily, the pressure signal is typically in the form of a pulse signal. The amplitude of the pressure signal measured by the pressure sensor at the entrance may be integrated over time, and the resulting integrated value may represent the load-bearing weight newly added to the escalator system or the moving walkway system; on the other hand, the amplitude of the pressure signal measured by the pressure sensor at the exit may be integrated over time, and the resulting integrated value may represent the load-bearing weight removed from the escalator system or the moving walkway system.

Exemplarily, assuming that pressure sensors C and D are installed at the entrance and exit of the escalator system or the moving walkway system, respectively, when a person or object passes through the entrance and exit, pressure measurement signals are generated at pressure sensors C and D. By subtracting the integral value of these pressure measurement signals, a net increment (which may be positive, zero, or negative) in the load-bearing weight of the escalator system or the moving walkway system during the current sampling period may be obtained, and this net increment is added to the cumulative value of the net increment at previous multiple moments to obtain the load-bearing weight of the escalator system or the moving walkway system during the current sampling period.

Similarly, in order to eliminate or reduce the cumulative error, the cumulative value of the net increment may be reset regularly or irregularly. To this end, the method shown in FIG. 3 proceeds to step 303 after performing step 302. In this step, the control device determines whether it is necessary to perform a reset operation on the cumulative value of the net increment. If so, it proceeds to step 304 to perform the reset operation, otherwise, it proceeds to step 102. After performing step 304, the process shown in FIG. 3 also proceeds to step 102.

In one example, the reset operation described above is triggered if the difference or net increment in the integrated value of the pressure measurement signals of pressure sensors C and D does not change within a sufficiently long period of time (optionally, the period of time is equal to the length of time it takes for a step of the escalator system or the moving walkway system to reach the exit from the entrance). In another example, the above reset operation is triggered when the cumulative value of the net increment exceeds a set value TW (e.g. significantly exceeds a value of the maximum load-bearing weight of the escalator system or the moving walkway system). In yet another example, if either of the above two trigger conditions is met, the reset operation is performed.

Figure 4:
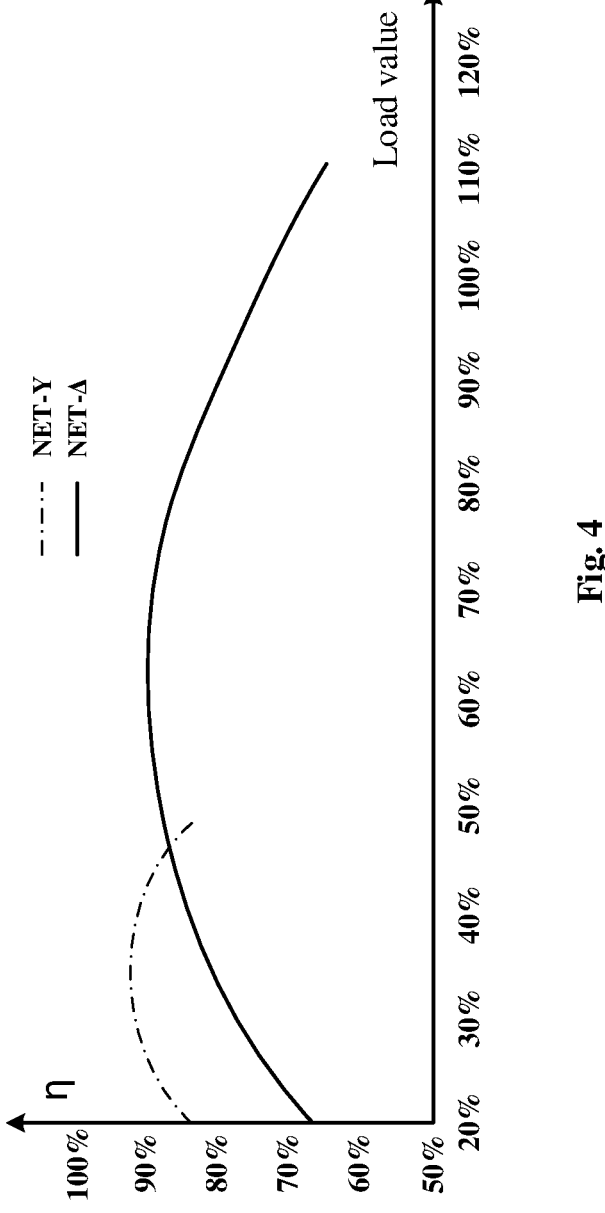
FIG. 4 shows a schematic relationship curve of motor efficiency versus load for a three-phase motor in a first operating frequency mode and a second operating frequency mode.

In still other embodiments, in step 102 of FIG. 1, the second threshold TH2 may be set equal to a critical value around which motor efficiency of the three-phase motor in the first operating frequency mode is close to its motor efficiency in the second operating frequency mode. Referring to FIG. 4, FIG. 4 shows a relationship curve of motor efficiency versus load for the three-phase motor in the first operating frequency mode and the second operating frequency mode. In FIG. 4, the vertical axis represents the motor efficiency $\eta$ and the horizontal axis represents the load value of the escalator system or the moving walkway system, which is expressed as a percentage relative to the rated load. As seen in FIG. 4, the motor efficiency of the three-phase motor in NET-Y mode (dashed line) is better than that of the three-phase motor in NET-$\Delta$ mode (solid line) in the lower load range (20%-50% range in FIG. 4), but as the load value approaches 50%, the motor efficiency in NET-Y mode continuously decreases while the motor efficiency in NET-$\Delta$ mode continues to increase and tends to be consistent around 50%. For the above changing characteristics, in the example shown in FIG. 4, a value within a small interval near 50% (such as 50%±2%) may be used as the above critical value.

Figure 5:
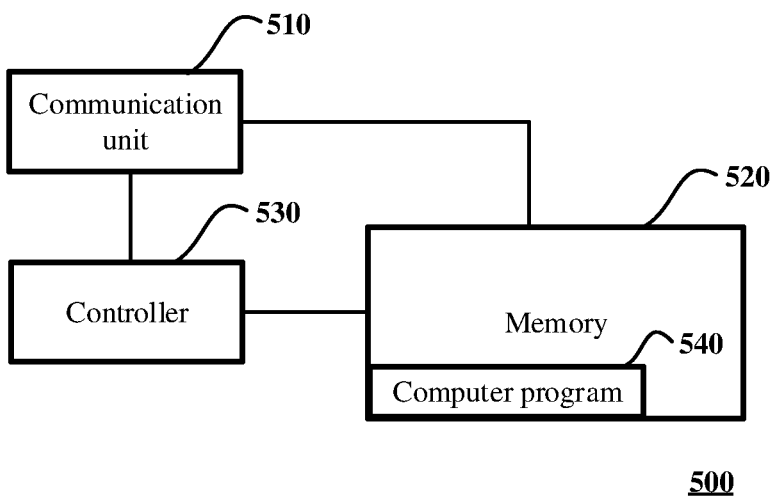
FIG. 5 is a schematic block diagram of a control device.

FIG. 5 is a schematic block diagram of a control device. The control device shown in FIG. 5 may be used to implement the methods shown in FIGS. 1-3 for controlling the escalator system or the moving walkway system.

As shown in FIG. 5, a control device 500 includes a communication unit 510, a memory 520 (for example, non-volatile memory such as flash memory, ROM, hard disk drive, magnetic disk, optical disc), a controller 530, and a computer program 540.

The communication unit 510, as a communication interface, is configured to establish a communication connection between the control device and external devices (e.g., photoelectric counting device and pressure sensor, etc.) or a network (e.g., the Internet). The communication unit 510 may be implemented using a network interface card.

The memory 520 stores the computer program 540 executable by the controller 530. In addition, the memory 520 may also store data generated when the controller 530 executes the computer program and data received from the external device via the communication unit 510 (e.g. count values, pressure signals, etc.).

The controller 530 is configured to run the computer program 540 stored on the memory 520 and to access data on the memory 520 (e.g., to recall data received from the external device and to store in the memory 520 the results of calculations such as the difference of count values and the integral value of pressure signals, etc.). The controller 530 may be implemented using a processor-based controller.

The computer program 540 may include computer instructions for implementing the methods described with the aid of FIGS. 1-3, enabling the corresponding methods to be implemented when the computer program 540 is run on the controller 530.

Figure 6:
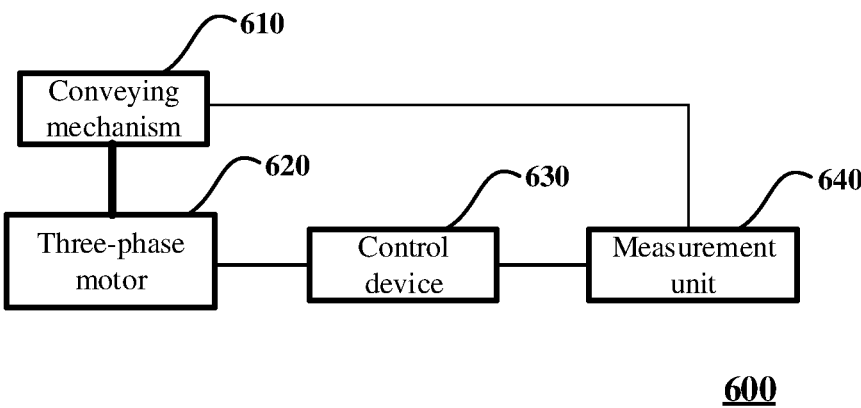
FIG. 6 is a schematic block diagram of a typical escalator system or a moving walkway system.

FIG. 6 is a schematic block diagram of a typical escalator system or a moving walkway system.

A system 600 shown in FIG. 6 includes a conveying mechanism 610 (e.g., an escalator), a three-phase motor 620 for driving the conveying mechanism 610, a control device 630 (e.g., a processor-based controller), and a measurement unit 640 (e.g., a photoelectric counting device or a pressure sensor, etc., arranged at the entrance and exit of the conveying mechanism).

The three-phase motor 620 may operate in one of the variable frequency mode VF mode (variable frequency mode), NET-Y mode (first operating frequency mode) and NET-$\Delta$ mode (second operating frequency mode). The control device 630 may have various features of the device shown in FIG. 5, which may be configured to implement the methods shown in FIGS. 1-3 for controlling the escalator system or the moving walkway system.

For existing control devices, the operating mode switching logic described above can be implemented simply by upgrading the control software running therein, which is advantageous in terms of reducing costs and shortening system development time.

In accordance with another aspect of the present application, there is also provided a computer-readable storage medium on which a computer program is stored which, when executed by a processor, can implement one or more steps contained in the method described above with the aid of FIGS. 1-3.

The computer-readable storage medium referred to in the application includes various types of computer storage media, and may be any available medium that may be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage devices, or any other transitory or non-transitory medium that may be used to carry or store a desired program code unit in the form of instructions or data structures and that may be accessed by a general-purpose or special-purpose computer or a general-purpose or special-purpose processor. The above combination should also be included in the protection scope of the computer-readable storage medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will appreciate that the various illustrative logical blocks, modules, circuits, and algorithm steps described herein may be implemented as electronic hardware, computer software, or combinations of both.

To demonstrate this interchangeability between the hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will recognize that the present application may be embodied in many other forms without departing from the spirit and scope thereof. Accordingly, the examples and implementations shown are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. A device for controlling an escalator system or a moving walkway system, comprising:
   a memory;
   a controller coupled with the memory; and
   a computer program stored on the memory and running on the controller, the running of the computer program causes:
   determining a load value of the escalator system or the moving walkway system; and
   determining a current operating mode of a three-phase motor in the escalator system or the moving walkway system in the following manner: if the load value is below a first threshold, determining a variable frequency mode as the current operating mode, if the load value is between the first threshold and a second threshold, determining a first operating frequency mode as the current operating mode, and if the load value exceeds the second threshold, determining a second operating frequency mode as the current operating mode,
   wherein the second threshold is greater than the first threshold,
   wherein windings of the three-phase motor are wired in a star wiring method and in a triangular wiring method in the first and second operating frequency modes, respectively.

2. The device of in claim 1, wherein the operation of determining the load value of the escalator system or the moving walkway system comprises:
   receiving a count value from a photoelectric counting device arranged near an entrance and exit of a conveying mechanism of the escalator system or the moving walkway system;
   determining, based on the received count value, the number of occupants of the escalator system or the moving walkway system, the number of occupants being used to indicate the load value.

3. The device of claim 2, wherein the operation of determining the load value of the escalator system or the moving walkway system further comprises:
   performing a reset operation on the count value based on one of the following conditions: i) if the count value of the photoelectric counting device at the entrance does not change during a set period; ii) if difference between the count values of the photoelectric counting device at the entrance and the photoelectric counting device at the exit exceeds a first set value.

4. The device of claim 1, wherein the operation of determining the load value of the escalator system or the moving walkway system comprises:
   receiving a pressure signal from a pressure sensor arranged near an entrance and exit of a conveying mechanism of the escalator system or the moving walkway system;
   determining a load-bearing weight of the escalator system or the moving walkway system based on an integral value of the received pressure signal over time, the load-bearing weight being used to indicate the load value.

5. The device of claim 4, wherein the operation of determining the load value of the escalator system or the moving walkway system further comprises:
   performing a reset operation on the integral value based on one of the following conditions: i) if difference between the integral values of the pressure signals at the entrance and at the exit over time does not change during a set period; ii) if a cumulative value of the difference exceeds a second set value.

6. The device of claim 1, wherein the first threshold is 0 and the second threshold is set equal to a critical value around which motor efficiency of the three-phase motor in the first operating frequency mode is close to its motor efficiency in the second operating frequency mode.

7. The device of claim 1, wherein in the variable frequency mode, the windings of the three-phase motor are wired in a star wiring method.

8. The device of claim 1, wherein the running of the computer program further causes:
   generating a control command to operate the three-phase motor in the determined current operating mode.

9. An escalator system or a moving walkway system, comprising:
   a conveying mechanism;
   a three-phase motor for driving the conveying mechanism, adapted to operate in a variable frequency mode, a first operating frequency mode and a second operating frequency mode, windings of the three-phase motor are wired in a star wiring method and in a triangular wiring method in the first and second operating frequency modes, respectively;
   a control device configured to:
   determine a load value of the escalator system or the moving walkway system; and
   determine a current operating mode of the three-phase motor in the escalator system or the moving walkway system in the following manner: if the load value is below a first threshold, determining the variable frequency mode as the current operating mode, if the load value is between the first threshold and a second threshold, determining the first operating frequency mode as the current operating mode, and if the load value exceeds the second threshold, determining the second operating frequency mode as the current operating mode,
   wherein the second threshold is greater than the first threshold.

10. The escalator system or the moving walkway system of claim 9, wherein the control device is configured to determine the load value of the escalator system or the moving walkway system in the following manner:

receive a count value from a photoelectric counting device arranged near an entrance and exit of the conveying mechanism of the escalator system or the moving walkway system;

determine, based on the received count value, the number of occupants of the escalator system or the moving walkway system, the number of occupants being used to indicate the load value.

11. The escalator system or the moving walkway system of claim 10, wherein the control device is further configured to determine the load value of the escalator system or the moving walkway system in the following manner:

perform a reset operation on the count value based on one of the following conditions: i) if the count value of the photoelectric counting device at the entrance does not change during a set period; ii) if difference between the count values of the photoelectric counting device at the entrance and the photoelectric counting device at the exit exceeds a first set value.

12. The escalator system or the moving walkway system of claim 9, wherein the control device is configured to determine the load value of the escalator system or the moving walkway system in the following manner:

receive a pressure signal from a pressure sensor arranged near an entrance and exit of the conveying mechanism of the escalator system or the moving walkway system;

determine a load-bearing weight of the escalator system or the moving walkway system based on an integral value of the received pressure signal over time, the load-bearing weight being used to indicate the load value.

13. The escalator system or the moving walkway system of claim 12, wherein the control device is further configured to determine the load value of the escalator system or the moving walkway system in the following manner:

perform a reset operation on the integral value based on one of the following conditions: i) if difference between the integral values of the pressure signals at the entrance and at the exit over time does not change during a set period; ii) if a cumulative value of the difference exceeds a second set value.

14. The escalator system or the moving walkway system of claim 9, wherein the first threshold is 0 and the second threshold is set equal to a critical value around which motor efficiency of the three-phase motor in the first operating frequency mode is close to its motor efficiency in the second operating frequency mode.

15. The escalator system or the moving walkway system of claim 9, wherein in the variable frequency mode, the windings of the three-phase motor are wired in a star wiring method.

16. The escalator system or the moving walkway system of claim 9, wherein the control device is further configured to:

generate a control command to operate the three-phase motor in the determined current operating mode.

17. A method for controlling an escalator system or a moving walkway system, comprising:

determining a load value of the escalator system or the moving walkway system; and determining a current operating mode of a three-phase motor in the escalator system or the moving walkway system in the following manner: if the load value is below a first threshold, determining a variable frequency mode as the current operating mode, if the load value is between the first threshold and a second threshold, determining a first operating frequency mode as the current operating mode, and if the load value exceeds the second threshold, determining a second operating frequency mode as the current operating mode, wherein the second threshold is greater than the first threshold, wherein windings of the three-phase motor are wired in a star wiring method and in a triangular wiring method in the first and second operating frequency modes, respectively.

18. The method of claim 17, wherein the step of determining the load value of the escalator system or the moving walkway system comprises:

receiving a count value from a photoelectric counting device arranged near an entrance and exit of a conveying mechanism of the escalator system or the moving walkway system;

determining, based on the received count value, the number of occupants of the escalator system or the moving walkway system, the number of occupants being used to indicate the load value.

19. The method of claim 18, wherein the step of determining the load value of the escalator system or the moving walkway system further comprises:

performing a reset operation on the count value based on one of the following conditions: i) if the count value of the photoelectric counting device at the entrance does not change during a set period; ii) if difference between the count values of the photoelectric counting device at the entrance and the photoelectric counting device at the exit exceeds a first set value.

20. The method of claim 17, wherein the step of determining the load value of the escalator system or the moving walkway system comprises:

receiving a pressure signal from a pressure sensor arranged near an entrance and exit of a conveying mechanism of the escalator system or the moving walkway system;

determining a load-bearing weight of the escalator system or the moving walkway system based on an integral value of the received pressure signal over time, the load-bearing weight being used to indicate the load value.

21. The method of claim 20, wherein the step of determining the load value of the escalator system or the moving walkway system further comprises:

performing a reset operation on the integral value based on one of the following conditions: i) if difference between the integral values of the pressure signals at the entrance and at the exit over time does not change during a set period; ii) if a cumulative value of the difference exceeds a second set value.

22. The method of claim 17, wherein the first threshold is 0 and the second threshold is set equal to a critical value around which motor efficiency of the three-phase motor in the first operating frequency mode is close to its motor efficiency in the second operating frequency mode.

23. The method of claim 17, wherein the method further comprises:

generating a control command to operate the three-phase motor in the determined current operating mode.

24. A non-transitory computer-readable storage medium having instructions stored in the computer-readable storage medium, when the instructions are executed by a processor, the processor is caused to execute operations comprising:

determining a load value of the escalator system or the moving walkway system; and determining a current operating mode of a three-phase motor in the escalator system or the moving walkway system in the following manner: if the load value is below a first threshold, determining a variable frequency mode as the current operating mode, if the load value is between the first threshold and a second threshold, determining a first operating frequency mode as the current operating mode, and if the load value exceeds the second threshold, determining a second operating frequency mode as the current operating mode, wherein the second threshold is greater than the first threshold, wherein windings of the three-phase motor are wired in a star wiring method and in a triangular wiring method in the first and second operating frequency modes, respectively.

* * * * *